United States Patent [19]

Knuppel et al.

[11] 4,249,719
[45] Feb. 10, 1981

[54] TUYERE FOR THE INJECTION OF REACTION GAS

[75] Inventors: Helmut Knuppel; Karl Brotzmann; Hans-Georg Fassbinder; Ernst Fritz, all of Sulzbach-Rosenberg, Fed. Rep. of Germany

[73] Assignee: Eisenwerk-Gesellschaft Maximilianshutte mbH, Sulzbach-Rosenberg, Fed. Rep. of Germany

[21] Appl. No.: 602,870

[22] Filed: Aug. 7, 1975

[30] Foreign Application Priority Data

Aug. 8, 1974 [DE] Fed. Rep. of Germany ....... 2438142

[51] Int. Cl.³ .............................................. C21B 7/16
[52] U.S. Cl. ..................................... 266/47; 266/218; 266/222; 266/266; 266/268; 266/270; 266/99
[58] Field of Search ............. 266/35, 36 P, 41, 34 PP, 266/218, 220–224, 243–247, 265–270, 99, 44, 47; 75/59, 60

[56] References Cited

U.S. PATENT DOCUMENTS

| 3,330,645 | 7/1967 | DeMoustier et al. | 266/35 X |
|---|---|---|---|
| 3,490,755 | 1/1970 | Lutgen | 266/41 X |
| 3,706,549 | 12/1972 | Knuppel et al. | 75/60 |
| 3,817,744 | 6/1974 | Leroy et al. | 75/60 |
| 3,830,173 | 8/1974 | Hubble et al. | 110/182.5 |
| 3,832,161 | 8/1974 | Leroy | 75/60 |
| 3,897,048 | 7/1975 | Pearce et al. | 266/35 |

Primary Examiner—Paul A. Bell
Attorney, Agent, or Firm—Lawrence I. Field

[57] ABSTRACT

A tuyere for the injection of both a refining gas such as oxygen into a melting or refining vessel, and a fluid protective medium such as a hydrocarbon gas or a liquid surrounding the injected refining gas, in which there is a solid center in the pipe through which the refining gas is suplied so that the refining gas enters the refining vessel as an annulus around which the protective fluid is disposed.

The tuyere is installd in the refractory lining of the refining vessel and the fluids passing into the vessel through the tuyere are proportioned so that burning back of the tuyere and erosion or wear of the lining take place at the same rate.

The protective medium cools the tuyere and avoids reactions between the refining gas and the tuyere material.

27 Claims, 6 Drawing Figures

TUYERE FOR THE INJECTION OF REACTION GAS

The invention relates to a tuyere for the injection of a refining gas, e.g. an oxidizing gas such as oxygen, with or without loading of solid materials, e.g. lime, into melting and refining vessels for metals. This tuyere is installed in the refractory lining of the vessel, and for avoiding reactions between the tuyere material and the refining gas, a gaseous and/or liquid protective medium is supplied to the tuyere, separately from the refining gas.

During the refining of metals, a refining gas, preferably technically pure oxygen, is introduced into the metal bath, in order to oxidize the undesired incidental elements and thus to remove the same from the melt.

For approximately the past five years a refining method has been adopted in practice to an increasing extent, in which method oxygen, surrounded by hydrocarbons, is introduced into the metal bath through tuyeres consisting of two concentric tubes. These refining gas tuyeres can be arranged above the surface of the melt, as described for instance in the German Offenlegungsschrift 2 200 413. Preferably, however, the refining gas tuyeres jacketed with hydrocarbon are arranged below the surface of the melt, particularly in the bottoms of the refining vessels.

In respect of the production of steel, the U.S. Pat. No. 3,706,549 discloses a process and a device for the practice of this process. It discloses various geometrical arrangements of the tuyeres, mainly in the bottom area of the refining vessels. The tuyeres consist of two concentric tubes. The refining oxygen flows through the central tube and liquid or gaseous hydrocarbons are introduced through the annular space between the inner and the outer tubes. In the annular space between the two tubes, spacers of various designs are arranged for maintaining the alignment of the two tubes.

Further patent specifications e.g. U.S. Pat. No. 3,771,989 describe the refining of steel by way of the above mentioned tuyeres and by loading the refining oxygen with solid materials. The steel refining process according to the two above named patents has become known in Europe under the designation "OBM Process" and is called "Q-BOP" in all other parts of the world.

Notwithstanding the convincing advantages of this new refining method in steel production, both in metallurgical and economical view, disturbances of the known tuyeres have occured occasionally in operational practice. It now appears that such malfunction of the tuyeres was caused by scrap pieces in the melt obstructing the outlets of the tuyeres for short periods and damaging or even closing a tuyere outlet completely in rare cases. Such damages of the tuyeres are virtually uncontrollable during usual converter operation in a steel plant and may lead to operational disturbances by causing delays in the refining process. Due to the difference in pressure of refining oxygen and protective fluid existing at the tuyere mouth, protective fluid may flow into the oxygen tube or vice-versa oxygen may flow into the protective fluid tube. Since the protective fluid consists preferably of hydrocarbons, mixing of oxygen and protective fluid may cause fire in the tuyere channels or even explosions by which the tuyere system will be damaged.

These disturbances have been counteracted by the installation of non-return valves and suitable pressure control systems. However, the disturbances cannot be totally avoided, particularly when suspensions of solid materials and oxygen are applied. When the oxygen is loaded with powdered, slag-forming material difficulties arise in the non-return valves and the pressure regulating equipment caused by the dust load and the increased abrasion.

Damages of the tuyere mouth by the impact of scrap pieces may have different effects depending on the kind of such damage, e.g. closing of the annular space, and the associated insufficient supply of the tuyere with protective fluid results in a premature burning-back of the tuyere. Compression of the oxygen injection tube leads to the breakdown of the whole tuyere. Functional inability of tuyeres during operation of the converter results in prolongation of the refining period, which is basically equivalent to a decrease in converter capacity. This disadvantage might be compensated by the installation of a greater number of tuyeres. However, apart from a decrease in economy, difficulties in the supervision of the tuyeres would result. On principle, one is interested in keeping the number of tuyeres in a converter as low as possible, in order to minimize and simplify the equipment for the supply of the tuyeres with media, and on the other hand to render possible the individual supervision of their supply of protective media which becomes very expensive from the technical point of view in case of a greater number of tuyeres. However, only the individual control of the supply of each tuyere with protective fluid guarantees a high level of operational reliability. Hence, a decrease of the number of tuyeres in a converter means generally an increase of its functional capability.

The number of the known tuyeres, however, cannot be decreased indefinitely in a converter, since an increase of the diameter of the oxygen injection tube may lead to a blowing-through of the melt with oxygen. The diameter of the oxygen injection tube has to be adapted to the depth of the bath. For example, in a 200-ton steel refining converter with usual oxygen pressure, at least 12 tuyeres with an inside diameter of the oxygen injection tube of about 40 mm are required.

The present invention concerns the development of a tuyere which retains all advantages of the known double-tube tuyere and which guarantees high operational reliability, in particular, ruggedness against damages caused by scrap pieces, and which permits at the same time a decrease in the number of tuyeres in a refining vessel without the oxygen blowing-through the bath. In addition, the improved tuyere is suitable for introducing any reaction gases into melting and refining vessels and contributes to an improvement of the blowing behavior and bath agitation in such vessels.

The tuyere according to the invention solves the set tasks by means of a solid body, hereinafter called "solid center" through which the refining gas does not pass and which is installed in the refining gas introduction channel of the tuyere. Thus, the supply channel for the refining gas appears in the cross section of the tuyere as an annular slot or similar to an annular slot.

Due to the fact that the cross section of the refining gas outlet has the shape of an annular slot, any damage to the tuyere openings, e.g. caused by pieces of scrap, is almost entirely avoided. When the tuyere according to the invention was applied under production conditions, partial damage of the annular slot occurred only rarely, and in no case was the function of the tuyere seriously impaired thereby.

In addition, the application of the tuyere according to the invention, with solid center and a cross section of the refining gas outlet in the shape of an annular slot, reduces the depth of penetration of the refining gas jets to about half the depth of penetration of the jets from the known double-tube tuyeres under comparable pressure conditions and at comparable cross sections of the outlets.

Although the tuyere with said cross sectional area of the outlet shaped as annular slot substantially fulfills virtually all of the desired operating requirements, it is within the meaning of the invention to superimpose a twist to the refining gas in order to further improve the effectiveness of the tuyere. Preferably this twist on the refining gas is achieved by installing suitable devices guiding the refining gas in the annular slot having a spiral or helical form. Due to these twist producing guiding devices inside the annular slot channel for the supply of refining gas, the amount of refining gas, e.g. the amount of oxygen, applied per tuyere, can be increased to an at least fivefold higher value compared to that of the known double-tube tuyeres under similar conditions.

Thus, the rate of flow of refining gas can be increased within a wide range by varying the diameter of the solid center of the tuyere and by varying the helix angle of the twist producing guiding devices. For example, amounts ten times higher compared to those reached under similar conditions with the double-tube tuyere have been injected in operating practice without recognizable disadvantages.

In the above described approximate values, the diameter of the solid center of the tuyere according to the invention was at least ten times wider than the width of the annular slot and thus considerably larger. By increasing the diameter of the solid center, the input of reaction gas can be increased. There are on principle no upper limits to the diameter of the solid center, except that maximum limits as to the tuyere will result from the geometrical form and size of the refining and/or melting vessel.

The solid center of the tuyere may consist of various materials. One simple practical solution is to fill a tube, having the diameter of the solid center, with a refractory ramming mass. High-quality magnesite materials with chromate-sulfate- and hydrate bonds have been found excellent. Compositions based on dolomite, alumina and fire-clay also were successfully utilized. The tube surrounding the solid center can constitute the wall of a small annular slot for feeding protective medium or inert gas, or it can be the inner wall of the annular slot, through which the refining gas in introduced.

The invention includes also the manufacture of the solid center out of other material impermeable to gas, as for example, metals, metal-ceramics, cermets or fused ceramic materials such as corundum or mullite. In case the solid center consists of those materials, impermeable to gas, an additional guiding tube for the solid center is not absolutely required and may be omitted as the case may be. The material of the solid center then represents the periphery of an annular slot, i.e. the annular slot through which the refining gas is introduced.

Metals such as copper, ordinary carbon steel and various types of special steels, preferably with a chromium content of more than 15% have been found to be suitable for the solid center.

For ease of manufacturing, the sectional shape of the solid center is preferably circular, however, it is not required to have a circular shape, In some cases, polygonal and also non-symmetrical shapes have proved successful. For example, a tuyere according to the invention with an oval solid center has been installed successfully in the side wall of an open hearth furnace. In this particular case, a circular-shaped solid center with a large diameter would have caused difficulties, due to the low depth of the bath inside this hearth type refining vessel.

Usually, the solid center is impermeable to fluid media. It is however, within the meaning of this invention to provide the solid center, depending on the individial situation, with channels, preferably in the form of bore holes, for introducing liquids or gases in order to influence the bath metallurgy. It has, for example, proved successful to introduce combustible solid materials together with inert gas through one or several channels in the solid center of the tuyere according to the invention into the bath.

Furthermore, there is often a channel in the solid center, preferably arranged in the center of the same, to accommodate a measuring instrument by which the length of the tuyere is measured.

The form of the guiding devices inside the channel, through which the reaction gas is introduced, and which give a twist to the flow of reaction gas, e.g. oxygen, with or without loading of powdered slag-forming agents, may vary to a considerable extent. Preferably, however, they are shaped helically, i.e. spirally and have a helix angle within the range of 10° to 70°. The helix angle may vary along the length of the tuyere. For example, when the tuyere according to the invention was used in an electric arc furnace, it has proved advantageous in case of a new-lined vessel to operate with a greater twist at the tuyere installed in the side wall and to reduce the twist superimposed to the reaction gas with increasing wear of the lining, in order to achieve penetration of the reaction gas into the melt up to about the furnace center during the whole furnace campaign.

In the tuyere according to the invention, also several guiding devices may be installed in one channel for the introduction of reaction gas. In such cases, it has proved expedient to connect the then formed chambers, e.g. sections of the annular slot, by transverse channels, throughout the whole length of the tuyere, respectively to divide the guiding devices into several parts throughout the length of the tuyere.

Corresponding to the wide range of possible shapes of the guiding devices, the arrangement of such guiding elements in the sectional area of the annular slots can also be carried out in different ways. Although already from 1/10 to 8/10 of the sectional area of the annular slots of experimental tuyeres was filled by guiding devices, no disadvantages relating to the favourable effect of the tuyere according to the invention was observed. The guiding devices were made of metal, e.g. copper, plain carbon steel and special steel. Guiding devices made of ceramic materials as well as metal-ceramics, cermets have also proved suitable. Ceramic parts with hydrate bond based on cement and aluminous cement have proved particularly advantageous due to the simple handling.

With in the meaning of this invention, a further embodiment of the tuyere appears as a part of cross section of which is similar to an annular slot, so to speak, a curved slot which throughout its length is embedded in refractory material.

Due to its insusceptibility to malfunction and to its capability to blow large amounts of reaction gas, e.g. oxygen, through the melt, the tuyere according to the invention permits the use of a very small number of tuyeres in a melting or refining vessel. In many installations, two tuyeres have been found sufficient. Thus, it is easy to control the protective fluid supply to each individual tuyere according to the invention, and a high level of operational reliability is attained. As regards operating practice, this means that during the whole campaign of the vessel, the tuyeres will work in all probability without any troubles. For example, two of the tuyeres according to the invention were used in a 60-tons converter, which worked without any malfunction for 10 vessel campaigns.

The supply channel for the reaction gas of the tuyere according to the invention which appears in its cross section as an annular slot or is similar to an annular slot, is surrounded by another narrower annular slot, through which the protective fluid is introduced. The annular slot for the protective medium may be divided into individial channels of various cross sectional shapes, e.g. semicircular. By division of the annular slot for the protective fluid into individual channels a more uniform distribution of the protective fluid around the reaction gas is achieved. At the same time, the whole structure of the tuyere according to the invention becomes mechanically stronger, thereby increasing the operational reliability of the tuyere.

Furthermore, the present invention may include another annular slot for the supply of protective fluid at the inside of the channel for the reaction gas. This inner annular slot for the protective fluid is similar in shape and width to the outer one as noted above. The outer annular slot for the protective fluid may be split up into individual channels, whereas the one at the inside may not have this subdivision, or vice versa. The tuyere according to the invention operates satisfactorily either with or without this inner annular slot. An inner annular slot is sometimes desirable, particularly when the tuyere is used as burner at certain times. The wider cross section then available for the flow of combustible gases and/or liquids, e.g. hydrocarbons, permits an increase of the fuel amount up to the stoichiometric ratio, related to oxygen. For example, the tuyere according to the invention may be used as burner during the heating-up time of the converter and for the preheating of scrap.

When refining metals, gaseous or liquid hydrocarbons have proved to be especially useful as protective media. Normally when using the tuyere for refining metals, the maximum amount of hydrocarbons, related to oxygen, is up to 10 percent by weight. This figure, however, does not represent an absolute upper limit, but may be exceeded under certain conditions.

Also $CO_2$, water vapor, inert gas and other gases or mixtures thereof can be used as protective media for the reaction gas. In case the tuyere according to the invention is used for refining metals, and if $CO_2$, water vapor or inert gas is used as the protective medium, the amount used has be be increased considerably compared to the amount used when hydrocarbons are applied. For example, operation has to be carried out with at least 40% of the non-hydrocarbon-containing protective media related to oxygen. Normally, this means for metal refining processes, a distinct worsening of the thermal balance, which becomes evident by the lower cooling scrap rates which may be used.

However, for certain metallurgical operations inside the melting and refining vessels by means of the tuyere, the use of non-hydrocarbon containing protective media may be desirable. It may also be within the meaning of certain metallurgical methods to use partly or fully the entire tuyere, i.e. also the cross section of the channel for the introduction of the reaction gas, for the introduction of inert gas, $CO_2$ or water vapor in certain phases of metal refining processes.

Furthermore, it has proved advantageous in practice to arrange the whole tuyere installation as a displaceable device in an additional annular slot which surrounds the annular slot for the outer supply of protective media. This second outer annular slot may also be used to pass through small amounts of protective media, e.g. hydrocarbons and other gases or liquids which is, however, not absolutely necessary. This additional annular slot permits, when necessary, an easy replacement for the whole part of the tuyere.

Another embodiment of the tuyere according to the invention provides for a solid center of the tuyere shaped conically throughout its whole length towards the tuyere mouth. The annular slots for the supply of protective fluid and for reaction gas also surround the solid center conically. With this embodiment of tuyere an effect can be obtained similar to that of superimposing a twist to the flow of the reaction gas, i.e. the rates of the reaction gas can be increased under otherwise comparable conditions compared with those achieved with a cylindrical arrangement of the supply channels, without blowing-through the metal bath. Compared to the embodiments of the tuyere according to the invention so far described, the mechanical structure of this tuyere is rather complicated. A combination of the conical type of tuyere with twist imparting devices is also within the meaning of the invention.

The inclined arrangement of the tuyeres for influencing the movement of the bath inside the melting or refining vessel represents another aspect of the invention. Due to this inclined arrangement of the tuyere, the angle of emergence of the reaction gas in front of the tuyere mouth, related to the outlet area of the tuyere, may be changed within a wide range and in any direction desired. In a 40-ton converter, for example, in the bottom of which two of the tuyeres according to the invention are installed, it has proved advantageous to install these tuyeres with an inclination of approximately 20° related to the longitudinal axis of the converter, in order to induce thereby a rotational impulse to the bath. The rotation of the metal bath has exerted a favourable influence on the blowing behavior of the converter. Slopping and undesired bath agitation were suppressed to a large extent.

Since during the refining with oxygen, loaded with solid materials, the walls of the annular slot for the reaction gas are worn by abrasion, the most suitable materials for the manufacture of tuyeres have turned out to be particular special steels which even during a long period of use do not wear out to a degree that a breaking-through of the tuyere walls has occurred, and which are composed as follows: C approximately 0.2 to 1.2%; Cr approximately 5 to 30%; and additional contents of Ni, Mn, Si which may vary within wide ranges, balance iron.

Other metals have been used including other special steels and may be provided with protective coatings, which counteract wear and which are applied to the wall surface of the annular slot, passed-through by the reaction gas, e.g. the oxygen-solid material suspension. Spray coatings of sintered metal, metal ceramics, ceramic suspensions or ceramic protective tubes as well as chromium plating have proved to be suitable.

When several of the tuyeres according to the invention have to be supplied with reaction gas with or without loading of solid materials, this is effected through a main supply pipe via an intermediate lime distributor to each of the tuyeres installed in the refractory material. The lime distributor provides an even distribution of the reaction gas-solid material suspension among the individual tuyeres. If only two tuyeres are used in a refining vessel, the lime distributor can be replaced by a suitable arrangement of the pipe system. In some installations, the supply of hydrocarbons to the individual tuyeres may be effected from a common supply line.

In view of the comparatively low number of tuyeres in the melting and/or refining vessels, the individual measured and adjusted supply of each tuyere with protective media has proved to be of advantage. When applied practically, the undesired burning-back of the tuyeres has no longer occurred in case of tuyeres with this individual regulation of the hydrocarbon amount. Furthermore, it is possible to keep the burning back of the tuyeres under close control and to adjust it reliably to the wear of the surrounding refractory brickwork. Another advantage of the individual regulation of the protective media for each tuyere is the possibility of a distinct decrease in the protective media consumption. When hydrocarbons were applied, half the amount was sufficient, compared to that used with the known double-tube tuyeres without individual regulation.

This invention will be further understood from the detailed explanation which follows, taken with the attached drawings in which.

Figure 1:
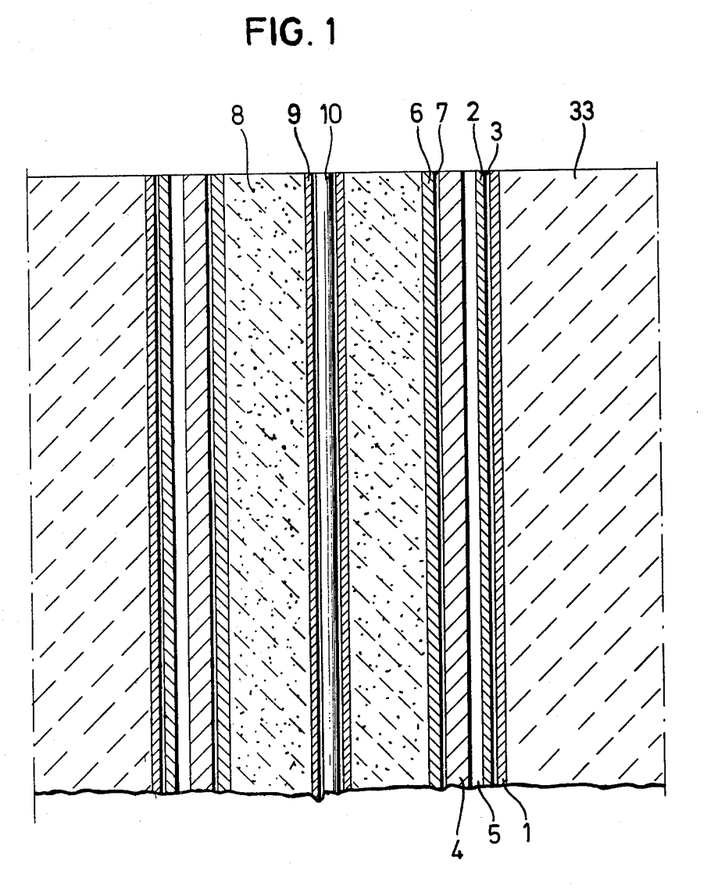
FIG. 1 is a longitudinal section of a part of a fragment of a tuyere according to the invention.

FIG. 1 shows a longitudinal section of the tuyere according to the invention. The tuyere is embedded in a refractory material 33 down to the steel sheet or cast bottom of the melting or refining vessel wall, e.g. as shown in U.S. Pat. No. 3,706,349. Outside of the embedding are the usual mounting flanges and the supply connections adapted for the tuyere according to the invention. Between the usual outer tube 1 of mild steel and a special steel tube 2 made with the following main alloying elements: approximately 0.5% C, 18% Cr and 8% Ni is an annular slot 3 for introducing a protective medium, preferably hydrocarbons. A second special steel tube 4 and tube 2 form an annular slot 5 for the supply of reaction gas with or without loading of solid materials. The special steel tube 4 and an inner copper tube 6 form an inner annular slot 7. The solid center 8 of the tuyere consists of a cast refractory mass with a high content of MgO. In the center of the tuyere, a tube 9 of mild steel is positioned accommodating a measuring rod 10 for ascertaining the length of the tuyere. All of the above structures have a common axis in FIG. 1.

The whole tuyere construction is mechanically very sturdy. This is an aspect which is important to the present invention, since it provides that damage caused by heavy scrap pieces in the bath is made practically impossible. However, should any damage occur at the mouth of the tuyere due to the impact of heavy scrap pieces, the tuyere of FIG. 1 will never be closed completely. Parts of channel 5 will always remain open. Thus, the formation of mixtures of protective medium and reaction gas inside the tuyere channels is avoided.

Another advantage of the tuyere according to the invention is that in case of disturbances of the gaseous and/or liquid media supply to the tuyere, the function of the tuyere is not impaired to any appreciable extent. In case of the known tuyeres with circular nozzle area for the reaction gas, for example, steel penetrates almost instantly deeply into the injection tube when the supply of reaction gas in interrupted, and obstructing it, renders it unserviceable. In case of disturbances of the reaction gas supply to the tuyere according to the invention, hot metal enters only the surface area of the annular slot for the reaction gas owing to an increased heat emmission, and no breakdown of the tuyere is caused, since at least parts of the sectional area of the annular slot remain always unobstructed.

Figure 2:
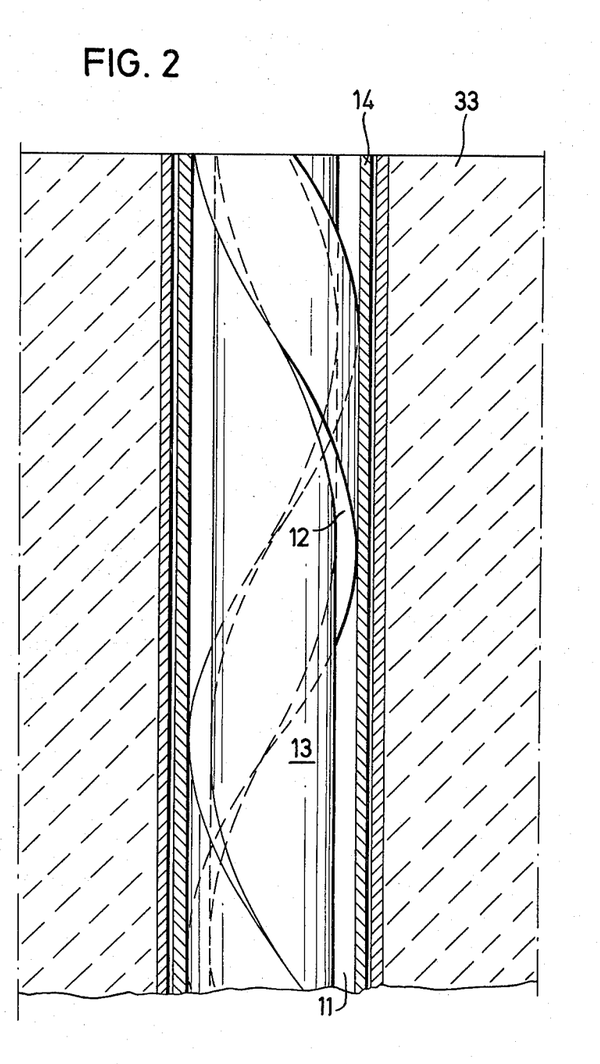
FIG. 2 is a longitudinal section of a part of a tuyere with guiding devices for superimposing a twist to the reaction gas-solid material suspension.

The tuyere, the longitudinal section of which is represented in FIG. 2, is similar to the tuyere shown in FIG. 1. In addition, there are, however, devices 12 installed inside the annular slot 5 for the reaction gas by which a twist is superimposed to the flow of the reaction gas. The solid center 13 of this tuyere design is made of special steel with the same components as tube 6.

Figure 3:
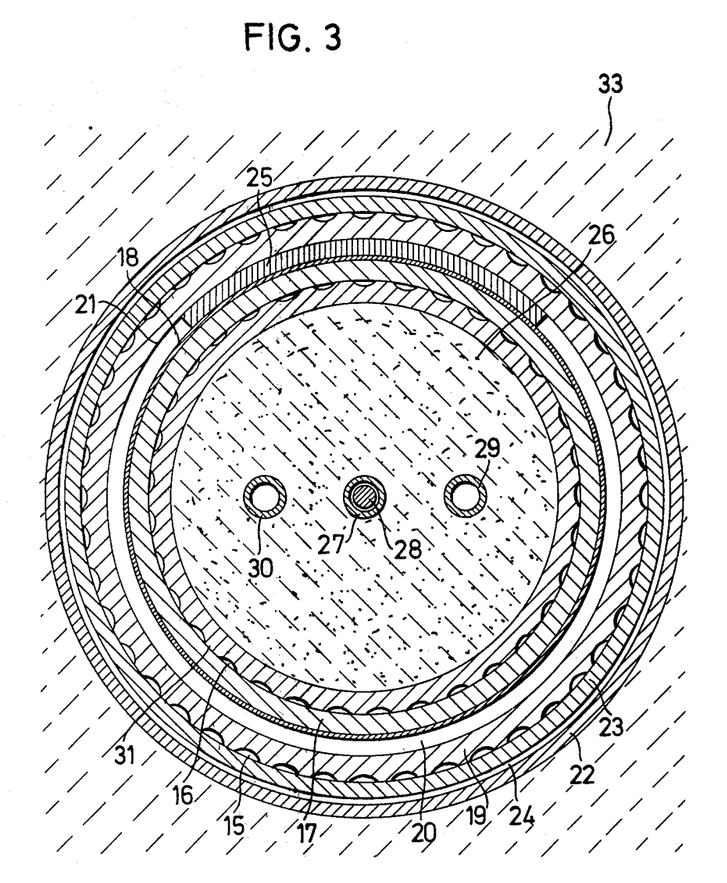
FIG. 3 is a top view of a tuyere installation.

FIG. 3 represents the cross section of a tuyere similar to that shown in FIG. 2. The annular slot is in this case designed as a multitude of small channels 15, 16. In this example, the tube 17 consists of copper and has a surface coat 18 consisting of sprayed-on, wear resistant, powdered metal. The surface of the special steel tube 19 is chromium plated 21 towards the annular slot 20 for the reaction gas or made wear resistant with the aid of metal powder, or with oxide-ceramic powder, applied by means of special torches. Number 25 shows the spiral-like guiding device for producing the twist. The tubes 17 and 23 may be plated on to the tuyere tubes 19 and 31 in order to use the cooling effect of the reaction gas to an optimum extent.

The whole tuyere construction is placed inside another normal mild steel tube 22 which forms the annular slot 24 together with tube 23. In this annular slot the tuyere installation is displaceable, i.e. if required, there is the possibility to replace the complete inner tuyere installation. In this example, hydrocarbons flow through the annular slot 24. The tuyere also has been used with some success without flow of hydrocarbons in slot 24 or with filling of ceramic powder in slot 24.

In the solid center 26, in which a tube 27 is placed which accommodates the measuring instruments 28 for determining the length of the tuyere, another two tubes 29 and 30 may be provided. Tubes 29 and 30 are made of special steel of the same composition as tube 19. These tubes 29 and 30 are used to convey solid materials, which are not suitable for loading in the flow of refining gas in annular slot 20, into the melt.

Such solid materials may be, for example, alloying elements, such as aluminum, silicon and coal, which are carried through the bores 29 and 30 by means of an inert gas, e.g. nitrogen. During the refining period, the channels in tubes 29 and 30 are kept clear by small amounts of protective media, such as natural gas, propane, butane or fuel oil. It has proved also to be of advantage to introduce a gas through the bores 29 and 30 for producing a stirring effect inside the refining vessel towards the end of the refining process within the period of very low bath movement. Those gases may be e.g. nitrogen, carbon dioxide, water vapor or inert gas.

Figure 4:
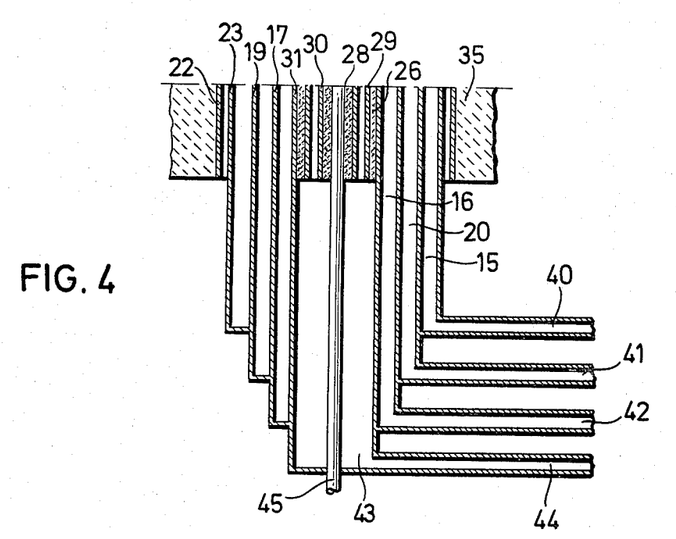
FIG. 4 is a diagrammatic fragmentary representation of a tuyere in a convertor bottom according to the invention with separate supplies for each annular slot.

FIG. 4 shows a section of a portion of a convertor bottom 35 with the tuyere of FIG. 3. This tuyere is moveable, respectively displaceable, placed in a stationary mild steel tube 22 arranged in the refractory wall of the bottom 35. From the individual annular slots 15, 16, 20, separate supplies 40, 41, 42 leads away. The channels 29, 30 provided in the solid center 26 are connected together with a supplying tube 43, 44, through which a tube 45 is provided to receive the measuring instruments 28.

Figure 5:
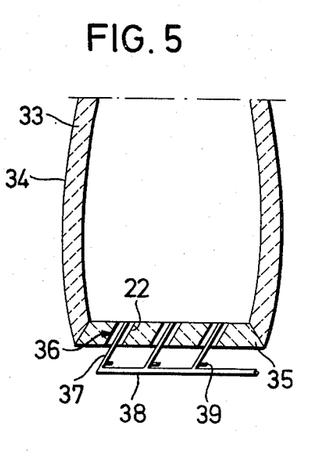
FIG. 5 is a section through a convertor with tuyeres inclined with respect to the vertical axis of the convertor.

The convertor, shown in FIG. 5, consists of a steel casing 34 having a refractory lining 33 and an inserted bottom 35. In the refractory bottom tuyeres 36 are installed, consisting of a mild steel tube 22, securely arranged in the refractory bottom 35, and a tuyere movably supported in tube 22.

The annular slots of the tuyere equipment 37 are partly connected with a joint supply 38 and partly connected with separate supplies 39.

Figure 6:
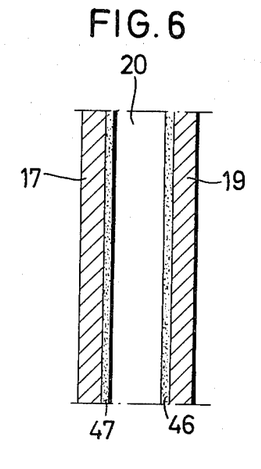
FIG. 6 is a longitudinal section through the two coated tubes defining the annular slots.

To avoid a too much abrasion of the tubes 17, 19, placed around the relating annular slot 20, by suspended solids, the surfaces of the tubes opposite each other and defining the annular slot 20 can be provided with abrasion-resistant layers, 46, 47 of for example sinter-metal, metal-ceramic or hard chromium, as shown in FIG. 6.

Instead of surface layers the tube 17 can be mantled also from an abrasion resistant tube. In a similar manner an abrasion resistant tube can be inserted in the tube 19.

For the use of the tuyere according to the invention, an example not meant to be restrictive or limiting in any way, is described below which relates to the refining procedure of a hot metal melt with scrap addition in a 150-ton convertor. The convertor has an open tap-hole and has an approximately spherical shape with a volume of approximately 100 m$^3$ after providing it with a new lining, which corresponds to a specific convertor volume of approximately 0.65 m$^3$ per ton of steel. In the convertor bottom consisting of dolomite, two of the tuyeres according to the invention are installed similar in their design to that shown in FIG. 3.

The operational tuyere is movably installed in an outer tube 23, i.e., it can be replaced. Outer tube 22 has an inner diameter of 350 mm, and a wall thickness of 4 mm; it consists of conventional carbon steel. The annular slot 24 is approximately 0.5 mm wide. Tube 23 consists of conventional carbon steel and has an inner diameter of 340 mm, and its wall thickness is 4 mm. Tube 23 together with tube 19 form the annular slot 15 for the protective media, in this case consisting of about 100 single channels around the circumference. The individual channel 15 being about 1 mm high and approximately 4 mm wide. Tube 19 consists of special steel with the following composition: C, 0.4%; Cr, 13%.

The reaction gas-solid material suspension is introduced through the annular slot 20 with a width of 7 mm, in this case oxygen with a loading of lime. The inner tube 17 is made of copper. Its outer surface forming the inside of the annular slot, is covered with a wear resistant metal layer about 1 mm thick. The inner surface of the tube 19, forming the inside of the annular slot is hard chrome plated. The inner annular slot 16 is similar in its design to the outer slot 15. Tube 31 forming the annular slot with tube 17 consists of the same material as tube 19. Tube 31 has an inner diameter of 300 mm, and its wall is 4 mm thick. The solid center inside the tube 31 consists of a chemically setting magnesia refractory. During the refining process approximately 500 Nm$^3$/hour of propane per tuyere flow through the annular slot 15. The annular slot 16 is supplied with 250 Nm$^3$/hour of propane per tuyere. Through the annular slot 20 for the reaction gas-solid material suspension, filled to approximately 2/10 with the spiral 25 producing the twist, during the refining process 24000 Nm$^3$/hour of oxygen flow per tuyere, loaded to a maximum amount of 6 kg line/Nm$^3$ of oxygen.

Prior to charging the hot metal into the convertor, 45 tons of scrap are preheated for approximately 14 minutes by means of the tuyeres according to the invention. The rate of propane amounted to approximately 4000 Nm$^3$/hour and the rate of oxygen was approximately 30000 Nm$^3$/hour. After preheating, the scrap has an average temperature of approximately 400° C. 120 tons of hot metal of the following composition are charged into the convertor: C 4.1%; Si 0.9%; Mn 0.8%; P 0.15%; S 0.05% at a temperature of approximately 1250° C.

A total of 7500 Nm$^3$ oxygen and 900 kg lime are injected through the two tuyeres into the melt during a refining period of approximately 12 minutes. The two tuyeres according to the invention are arranged 250 mm away from the bottom center on the bottom diameter below the tilting axis of the convertor. The tuyeres are installed in the same direction of rotation with an inclination of 20° related to the longitudinal axis of the convertor in the direction of the bottom tangent. Due to this position of the tuyeres according to the invention, a rotational impulse is induced in the melt which has a favorable effect upon the blowing behavior.

At the end of the indicated refining period of 12 minutes, the final analysis of the steel is as follows: C, 0.04% Mn, 0.3%; P, 0.008%; S, 0.02%; N$_2$,0.002%; H$_2$, 0.0003%. The temperature of the melt at tap was 1620° C.

We claim:

1. In a tuyere for the injection of reaction gas, with or without load of solid materials into vessels for refining metals, the tuyere being installed in the refractory lining of the vessels and burning-back in conformity with the wear of this refractory lining, and in order to avoid reactions between the tuyere material and the refining gas, a gaseous and/or liquid protective medium is supplied to the tuyere, separately from a reaction gas supplied through a supply channel, the improvement which consists in that inside said supply channel of the tuyere for the reaction gas, a solid center is provided, which is not passed through by reaction gas and that in the cross section of the tuyere the supply channel for the reaction gas appears as a slot or in a shape similar to an annular slot surrounding the periphery of said solid center.

2. A tuyere according to claim 1, wherein the diameter of the solid center of the tuyere, which is not passed through by the reaction gas, corresponds to at least ten times the value of the width of the annular slot.

3. A tuyere according to claim 1 wherein the solid center consists of a refractory material which is impermeable to the reaction gas.

4. A tuyere according to claim 1 wherein the solid center consists of metal.

5. A tuyere according to claim 1 wherein the solid center consists of metal, ceramics, cermets or fused ceramic material.

6. A tuyere according to claim 1 wherein the solid center contains at least one channel.

7. A tuyere according to claim 6 wherein said channel in the solid center is adapted to accommodate a measuring device for ascertaining the length of the tuyere.

8. A tuyere according to claim 1 wherein the solid center of the tuyere not passed through by reaction gas is oval, polygon, non-symmetrical or circular shaped.

9. A tuyere according to claim 1 wherein guiding devices are arranged inside the supply channel for the reaction gas, in order to impart a twist to the reaction gas.

10. A tuyere according to claim 9 in which the guiding devices have a spiral or helix-like form and the helix angle of the guiding elements is between 10° to 70°.

11. A tuyere according to claim 10 wherein the helix angle of the guiding devices varies along the length of the tuyere.

12. A tuyere according to claim 9 in which the guiding devices in the reaction gas supply channel occupy from 1/10 to 8/10 of the sectional area of the channel.

13. A tuyere according to claim 1 wherein the slot for the introduction of reaction gas is arranged helically in the refractory lining.

14. A tuyere according to claim 1 wherein the supply channel for the reaction gas, e.g. for introducing an oxidizing gas with or without load of solid material is surrounded by at least one additional slot of smaller width compared to that of the channel of the reaction gas on at least one side of said channel, said smaller slot being for the supply of a protective medium.

15. A tuyere according to claim 14 wherein said slot for the protective media is divided into a plurality of individual channels.

16. A tuyere according to claim 15 wherein the solid center is arranged movably in the slot for the protective medium.

17. A tuyere according to claim 14 in which at least one channel is provided extending lengthwise through said solid center.

18. A tuyere according to claim 14 wherein the reaction gas supply channel and the slots, are each connected to their own medium supply.

19. A tuyere according to claim 1 wherein the walls of the supply channel for the reaction gas are made of special steel or copper.

20. A vessel in which at least one tuyere according to claim 1 is installed with an inclination inside the vessel, the inclination being relative to the axis of the convertor.

21. A tuyere according to claim 1 wherein the inner surfaces of the supply channel for the reaction gas which is used for the transport of solid material is provided with a wear-impeding layer comprising sintered metal, metal ceramics, ceramic tubes, ceramics or chromium plating.

22. A refining vessel provided with a plurality of tuyeres according to claim 1 wherein the supply of reaction gas to said tuyeres with or without load of solid material, is effected by means of a common supply line and the protective media control is effected individually for each tuyere.

23. A refining vessel according to claim 22 including in addition an intermediate distributor for solid material disposed between a source of supply and said plurality of tuyeres.

24. A process for treating a molten metal bath in a refractory-lined vessel comprising, injecting into said molten metal an annular-like stream of refining gas; and simultaneously injecting two annular-like streams of protective jacket fluid, one concentrically inside the refining gas stream, and the other concentrically outside the refining gas stream with both of said streams of protective jacket fluid being contiguous on one side thereof with said refining gas stream and on the other side thereof with said molten metal bath.

25. A tuyere for use in a bottom-blown metal refining vessel comprising:
(a) an axially extending fluid impervious core plug;
(b) a plurality of concentrically spaced tubular members concentric with said core plug defining a plurality of substantially annular passageways;
(c) means for connecting one of said passageways to a source of metal refining fluid; and
(d) means for connecting adjacent passageways on opposite sides of said one passageways to a source of protective jacket fluid.

26. A tuyere according to claim 25 in which said core plug is formed of refractory material.

27. In a vessel for refining a molten metal bath contained therein, said vessel including a refractory lined closure having an opening in its upper portion and at least one tuyere extending through said bottom portion placing the passageways therein in fluid communication with the interior of said vessel, the improvement comprising a tuyere having:
(a) an axially extending fluid impervious core plug;
(b) four mutually spaced tubes concentric with said core plug forming three substantially concentric annular passageways;
(c) two of said passageways being connected to a source of protective jacket fluid; and
(d) the passageway intermediate said two passageways being connected to a source of refining fluid.

* * * * *